United States Patent [19]

Simone

[11] 4,332,927
[45] Jun. 1, 1982

[54] CATALYST-CONTAINING STABLE POLYURETHANE FORMING COMPOSITIONS WHICH ARE NON-CYTOTOXIC WHEN CURED AND SEPARATORY DEVICES EMPLOYING SAME

[75] Inventor: Dominic Simone, Lincroft, N.J.

[73] Assignee: CasChem, Inc., Bayonne, N.J.

[21] Appl. No.: 206,816

[22] Filed: Nov. 14, 1980

[51] Int. Cl.³ .............................................. C08G 18/24
[52] U.S. Cl. ................................... 528/58; 210/321.1;
210/321.2; 210/321.3; 210/321.4; 210/321.5;
210/500.1; 210/500.2; 210/506
[58] Field of Search ............ 528/58; 210/321.1, 321.2,
210/321.3, 321.4, 321.5, 500.1, 500.2, 506;
252/182

[56] References Cited

U.S. PATENT DOCUMENTS

| | | | |
|---|---|---|---|
| 3,280,049 | 10/1966 | Hyre et al. | 528/58 |
| 3,392,153 | 9/1968 | Hostettler et al. | 528/58 |
| 3,706,714 | 12/1972 | Lloyd et al. | 528/58 |
| 3,907,687 | 9/1975 | Hoeltzenbein | 264/258 |
| 3,925,037 | 12/1975 | Ward et al. | 210/321.1 |
| 3,931,387 | 1/1976 | Hostettler | 528/58 |
| 4,006,124 | 2/1977 | Welte et al. | 521/118 |
| 4,045,527 | 8/1977 | Babayan et al. | 528/58 |
| 4,115,320 | 9/1978 | Meyborg | 521/124 |
| 4,150,212 | 4/1979 | Meyborg | 521/124 |
| 4,170,559 | 10/1979 | Kroplinski et al. | 55/158 |

*Primary Examiner*—Maurice J. Welsh
*Attorney, Agent, or Firm*—Pennie & Edmonds

[57] ABSTRACT

The present invention is directed to improvements in non-cytotoxic polyurethane compositions. The improvement in the polyurethane compositions is achieved by reacting at least one NCO-terminated prepolymer and at least one polyol in the presence of a dialkyltin dicarboxylated catalyst composition. The catalyst reduces the curing time of the polyurethane resin and cannot be released therefrom. The improved polyurethane compositions are advantageously employed in separatory devices such as hollow fiber separatory devices intended to be used in biomedical applications. The separatory device employs at least one separatory membrane suitable for the intended end use application which is secured, potted or sealed in a housing using a cured flexible polyurethane composition.

15 Claims, No Drawings

CATALYST-CONTAINING STABLE POLYURETHANE FORMING COMPOSITIONS WHICH ARE NON-CYTOTOXIC WHEN CURED AND SEPARATORY DEVICES EMPLOYING SAME

BACKGROUND OF THE INVENTION

Two-component polyurethane forming systems are well known. Such systems typically comprise as a first component an NCO-terminated prepolymer and as a second component a polyfunctional alcohol, i.e., polyol. Typically, these components are reacted in the presence of a catalyst, the hydroxyl groups of the polyol reacting with the NCO groups of the NCO-terminated prepolymer to form a polyurethane. Alternatively, it is possible to form polyurethane compositions in the absence of a catalyst. See, e.g., U.S. Pat. No. 4,170,559, which is incorporated herein by reference.

One useful application for the polyurethane compositions formed in the manner described above is as a sealing resin or potting resin employed in the manufacture of filtration and separation equipment. In particular, the polyurethane compositions are useful as sealing resins in the manufacture of separatory devices used in industrial filtration applications and biomedical applications as well as in certain food, drug and cosmetic applications.

However, in such applications, the choice of sealing or potting resins is severely limited by the fact that the resins can not be toxic during use. The residual presence of toxic catalysts, for example, is to be avoided. The presence of such catalysts may create the risk of catalyst exudation, resulting in undesirable contamination of the fluids passing through the filtration or separation equipment.

It has become desirable to prepare formed polyurethane compositions for use, e.g., in the above applications, employing prepackaged polyol/catalyst solutions. This procedure is economically advantageous, allowing use of a complete polyurethane system in two packages (isocyanate terminated prepolymer and polyol/catalyst solution) instead of three (polyol, isocyanate terminated prepolymer and catalyst). It is therefore desirable to prepare polyol/catalyst mixtures where the catalysts are soluble in various polyols and which remain in solution even when the polyol is exposed to freezing temperatures. It is also desirable to prepare polyol/catalyst mixtures wherein catalytic efficiency is maintained over extended periods of time.

Recently, in connection with certain applications, it has also become desirable to employ two-component polyurethane forming systems wherein the NCO-terminated prepolymer is derived from aliphatic isocyanates rather than aromatic isocyanates. It has been suggested that employing aliphatic isocyanates avoids the possibility of toxic aromatic amines being formed by hydrolysis of aromatic isocyanates.

Therefore, polyurethane forming compositions and formed polyurethane compositions which can employ NCO-terminated prepolymers derived from aliphatic isocyanates have become increasingly desirable.

A number of catalysts are known to increase the reaction rate between the hydroxyl groups of the polyol and the NCO groups of the NCO-terminated prepolymer, e.g., catalysts such as aliphatic and cycloaliphatic tertiary amines, certain soluble metal compounds and certain acids.

Polyurethane forming compositions and formed polyurethane compositions employing known catalysts have certain significant drawbacks. For example, while composition formation reactions employing the aliphatic and cycloaliphatic tertiary amine catalysts discussed above are known to exhibit increased hydroxylisocyanate reaction rates, compositions employing such catalysts are unsuitable for use in the filtration and separation equipment under consideration here because of their cytotoxicity.

Polyurethane forming systems and formed polyurethane compositions employing amidine-metal complexes and amine-metal combinations are also known. See, e.g., U.S. Pat. Nos. 4,006,124, 4,115,320 and 4,150,212. However, compositions employing such catalysts are also unsuitable for use in the filtration and separation equipment under consideration here because of their cytotoxicity.

The hydroxyl-isocyanate reaction rate is also known to be slightly increased in polyurethane formation reactions employing strong acids, as illustrated by J. Saunders and K. Frisch, *Polyurethanes, Chemistry and Technology* at 211–215 (1962). However, acids in general are very cytotoxic when introduced into the blood stream and their residual presence in, e.g., potting resins, adhesives, coatings, sealants or encapsulants used in the filtration and separation equipment under consideration here is to be avoided because of the risk that they will exude and contaminate the fluids passing through the equipment.

Polyurethane forming compositions and formed polyurethane compositions employing metal compounds such as tin octoate or ferric acetyl acetonate have also been known to increase the hydroxyl-isocyanate reaction rate in polyurethane formation reactions. While polyurethane compositions employing tin octoate have been found to be non-toxic, it has been found that tin octoate is hydrolytically unstable and must be added to the polyol on site rather than during packaging of the polyol. Ferric acetyl acetonate is toxic at levels of about 0.1% by weight and higher and imparts a dark red color to the polyurethane.

Other polyurethane catalysts, i.e., stannous carboxylates, ferric acetylacetonate, titanium alcoholate, etc., are very efficient catalysts but also very hydrolytically unstable. When dissolved in polyols their solutions must be used soon after their preparation or they will lose most or all of their catalytic activity through oxidation and hydrolysis by the water generally present in the polyols. For a polyol solution of the catalyst that remains stable and does not change in activity (i.e., geltime, non-flow time and demold time) the catalyst has to be oxidation resistant and hydrolytically stable. Its activity has to remain constant over long periods of time at room temperature and higher. Conditions which are generally encountered when such solutions are stored for a long period of time in a warehouse.

For this reason, it is desirable to have catalyst-containing polyurethane forming compositions which are hydrolytically stable in solutions of different polyols at different water contents.

Polyurethane forming compositions and formed polyurethane compositions employing N-N-N'-N' tetrakis (2-hydroxypropyl) ethylene diamine, generally known as QUADROL (a trademark of Wyandotte Chemical Co.) are known. See, e.g., U.S. Pat. No. 4,224,164. However, several drawbacks are associated with such systems. Large amounts of QUADROL catalyst are generally required to be used in the preparation of commercial polyurethane. For example, in systems employing prepolymers derived from aromatic isocyanates, amounts up to about 15% by weight, based on the weight of the polyol, are required. Employing such large amounts of catalyst is undesirable, often requiring frequent reformulation of the polyurethane compositions to maintain consistent physical properties. Further, since the QUADROL catalyst is tetrafunctional, a high degree of crosslinking is introduced which also may significantly change the physical properties of the polyurethane compositions. Finally, use of the QUADROL catalyst, which possesses a low molecular weight and high hydroxyl value, requires the use of large amounts of the isocyanate-terminated prepolymer, which is expensive and therefore economically disadvantageous.

Polyurethane forming compositions and formed polyurethane compositions employing ricinoleic acid as a catalyst are known to be non-toxic and are hydrolytically stable. However, large amounts of ricinoleic acid catalyst, e.g., amounts up to about 30% by weight, based on the weight of polyol, are generally required to be used in the preparation of commercial polyurethanes. See, e.g., Kroplinski et al, U.S. patent application Ser. No. 90,206, filed Nov. 1, 1979, now U.S. Pat. No. 4,256,617.

The search has therefore continued for polyurethane compositions which are derived from aliphatic or aromatic isocyanates, which are non-cytotoxic and which can be prepared employing relatively non-cytotoxic catalyst than has heretofore been possible and for stable polyol/catalyst solutions useful in preparing such compositions. The present invention is a result of that search.

SUMMARY OF THE INVENTION

In one aspect of the present invention there is provided a two component polyurethane forming composition which is non-cytotoxic when cured. The composition consists essentially of a first component of at least one NCO-terminated prepolymer, and a second component of at least one polyol. An effective catalytic amount of a dialkyltin dicarboxylated compound having the formula:

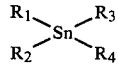

wherein:
$R_1$ and $R_2$ represent linear or branched alkyl groups having less than about 18 carbon atoms per molecule; and
$R_3$ and $R_4$ represent carboxylate groups derived from (a) one or more saturated or unsaturated, linear or branched aliphatic hydroxy-carboxylic acids having from about 2 to about 18 carbon atoms per molecule; (b) one or more saturated or unsaturated, linear or branched, aliphatic carboxylic acids having from about 14 to about 20 carbon atoms per molecule; and (c) mixtures of (a) and (b),
is incorporated into the polyol component prior to curing and is stable therein.

In another aspect of the present invention there is provided a stable polyol/catalyst composition which may be employed in a two component polyurethane forming composition which is non-cytotoxic when cured. The polyol/catalysts composition consists essentially of a mixture of at least one polyol and an effective catalytic amount of the dialkyltin dicarboxylated compound described immediately above.

In still another aspect of the present invention there is provided a cured non-cytotoxic polyurethane composition which consists essentially of the reaction product of:
(a) as a first component at least one NCO-terminated prepolymer;
(b) as a second component of at least one polyol; and
(c) an effective catalytic amount of the dialkyltin dicarboxylated compound described immediately above.

The dialkyltin dicarboxylated compound is incorporated into said second component prior to curing and is stable therein.

In another aspect of the present invention there is provided an improved process for preparing a separatory device wherein a portion of at least one separatory membrane is secured in a housing using a non-cytotoxic cured polyurethane composition provided by reacting a first component comprising at least one NCO-terminated prepolymer with a second component comprising at least one polyol. The improvement comprises reacting said NCO-terminated prepolymer of the first component with said polyol of the second component in the presence of an effective catalytic amount of a catalyst consisting essentially of a dialkyltin dicarboxylated compound described immediately above. The dialkyltin dicarboxylated compound is incorporated in said second component prior to curing and is stable therein.

In yet another aspect of the present invention there is provided an improved separatory device wherein at least one separatory membrane is secured in a housing in a manner sufficient to perform the selection biomedical function using a non-cytotoxic cured polyurethane composition provided by reacting a first component comprising an NCO-terminated prepolymer with a second component comprising at least one polyol. The improvement comprises using as the non-cytotoxic polyurethane composition at least one of said NCO-terminated prepolymers of the first component reacted with at least one of said polyols of the second component in the presence of an effective catalytic amount of a catalyst consisting essentially of the dialkyltin dicarboxylated compound described immediately above. The dialkytin dicarboxylated compound is incorporated into said second component prior to curing and is stable therein.

DESCRIPTION OF THE PREFERRED EMBODIMENTS

The non-toxic polyurethanes of the present invention are typically formed by the catalyzed reaction of an NCO-terminated prepolymer with a polyol. In the present invention, the catalysts are typically combined with the polyol component into polyurethane forming compositions prior to curing and are stable therein.

It has now been found that polyurethane forming compositions and formed polyurethane compositions exist which incorporate certain catalysts in relatively small amounts in the polyurethane formation reaction. The formation reactions take place at accelerated reaction rates, reducing the curing time and the demolding time of the polyurethanes and thus allowing for shorter and more economical production cycles.

The catalysts which may be employed in the present invention are dialkyltin dicarboxylated compounds having the formula:

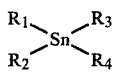

wherein:

$R_1$ and $R_2$ are linear or branched alkyl groups having less than about 18 carbon atoms per molecule; and $R_3$ and $R_4$ are members selected from the group consisting of carboxylate groups derived from (a) one or more saturated or unsaturated, linear or branched aliphatic hydroxy-carboxylic acids having from about 2 to about 18 carbon atoms per molecule; (b) one or more saturated or unsaturated, linear or branched, aliphatic carboxylic acids having from about 14 to about 20 carbon atoms per molecule; and (c) mixtures of (a) and (b).

The number of carbon atoms per molecule in the alkyl groups which comprise $R_1$ and $R_2$ is preferably from about 8 to about 18. While the present invention as claimed herein contemplates employing alkyl groups having more than 18 carbon atoms per molecule, catalytic efficiency, which is believed to be a function of the relative amount of tin present, is decreased significantly as the number of carbon atoms per molecule rises above 18.

$R_3$ and $R_4$ may constitute carboxylate groups derived from one or more saturated or unsaturated, linear or branched, aliphatic hydroxy-carboxylic acids having from about 2 to about 18 carbon atoms per molecule. Representative aliphatic hydroxy-carboxylic acids from which the $R_3$ and $R_4$ carboxylate groups are derived include those ranging from glycolic acid to ricinoleic acid, and include, e.g., glycolic acid, hydroxy propanoic acid, hydroxy butyric acid, hydroxy valeric acid, hydroxy methyl valeric acid, hydroxy caproic acid, hydroxy octanoic acid, hydroxy decanoic acid, hydroxy lauric acid, 12-hydroxy stearic acid, hydroxy pentadecanoic acid, hydroxy palmitic acid and ricinoleic acid.

$R_3$ and $R_4$ may also constitute carboxylate groups derived from one or more saturated or unsaturated, linear or branched, aliphatic carboxylic acids having from about 14 to about 20 carbon atoms per molecule. Representative aliphatic carboxylic acids include, e.g., myristic acid, pentadecanoic acid, palmitic acid, margaric acid, stearic acid, arachidic acid, myristoleic acid, palmitoleic acid, oleic acid, linoleic acid, linolenic acid and mixtures thereof. Various commercial acids are available which comprise mixtures of such acids and which may be employed in the present invention. For example, commercial palmitic acid, which may comprise from 66% to 98% palmitic acid and the balance a mixture of myristic acid, pentadecanoic acid, margaric acid and stearic acid, and commercial oleic acid, which may comprise from 40% to 98% oleic acid and the balance a mixture of myristic acid, palmitic acid, palmitoleic acid, linoleic acid and linolenic acid, may be employed in the present invention.

$R_3$ and $R_4$ may also be carboxylate groups derived from mixtures of the aliphatic hydroxy-carboxylic acids and aliphatic carboxylic acids described above. Preferably, $R_3$ and $R_4$ are carboxylate groups derived from the same aliphatic hydroxy-carboxylic acid or aliphatic carboxylic acid. Thus, the preferred catalysts used in the present invention are, e.g., dialkyltin diricinoleates, dialkyltin dioleates or dialkyltin di-6-hydroxy caproates.

The preferred catalysts employed in the present invention include, e.g., dioctyltin diricinoleate, dioctyltin dioleate, didodecyltin diricinoleate and dioctyltin di-6-hydroxy caproate. Dioctyltin diricinoleate is most preferred.

Generally, two broad types of polyurethane systems are commercially employed. These are (a) polyurethane systems incorporating aromatic isocyanates and (b) polyurethane systems incorporating aliphatic isocyanates. As stated above, the present invention contemplates polyurethane forming compositions effective to generate non-cytotoxic, polyurethane systems which incorporate either type of isocyanate.

The catalysts employed in the present invention are dissolved into the polyol component of the polyurethane in an amount effective to reduce the gel and demold time as defined herein. The catalyst concentration may generally vary, depending, e.g., on (a) the nature of the polyurethane system to be catalyzed, (b) the temperatures employed in the preparation of the polyurethane and (c) the desired pre-cure time. Preferably, the catalysts are employed in the present invention in amounts ranging from about 0.01 to about 10%, and most preferably from about 0.05 to about 5%, by weight, based on the weight of the polyol. The catalysts employed are solution stable, hydrolytically stable and substantially unreactive with the polyol at room temperature. This is a distinct advantage in that it can be added to the polyol immediately after or during (provided it is added under conditions, e.g., low temperatures, such that it will not react during polyol formation) its manufacture rather than on site where the polyurethane is employed in making separatory devices or other filtration or separation equipment which are the subject of this invention.

When aliphatic isocyanates are employed, the catalyst concentrations are generally in the range of about 5.0% by weight based on the weight of the polyurethane. When aromatic isocyanates are employed, catalyst concentrations are generally much lower, e.g., in the range of about 0.15% by weight based on the weight of the polyurethane. Whatever the system and catalyst used, the final composition must be non-cytotoxic in accordance with the cytotoxicity test set forth below.

Other organic metallic compounds, such as organotin, organo antimony and organo aluminum compounds are unacceptable for the purposes of the present invention, for reasons of high toxicity or instability.

While applicants do not desire to be bound to any particular theory, it is believed that the catalysts employed in the present invention, due to a combination of chain length and the presence of hydroxy groups, entangle or intertwine themselves within the polyurethane structure, thus rendering themselves unextractable and the polyurethane composition non-cytotoxic.

The NCO-terminated prepolymer employed in the present invention are formed from the reaction product of a polyfunctional alcohol and a polyfunctional isocyanate. The proper selection of reactants to achieve a polyurethane for use in the filtration and separation devices contemplated herein is well within the skill in the art, as illustrated by U.S. Pat. No. 3,962,094, which is incorporated by reference herein, when guided by the requirements described herein for the polyurethane.

Thus, representative examples of the polyisocyanates which may be employed in the preparation of the NCO-terminated prepolymer include aromatic isocyanates as illustrated by the di- and tri-isocyanates of the benzene and naphthalene series and mixtures thereof. Illustrative of aromatic isocyanates that may be employed include diphenylmethane, 4,4'-diisocyanate (MDI); tolylene diisocyanate (2,4/2,6); toluene 2,4-diisocyanate; toluene 2,6-diisocyanate; m-phenylene diisocyanate; xylene 4,4'-diisocyanate; naphthalene 1,5-diisocyanate; diphenylene 4,4'-diisocyanate; diphenylene ether 4,4'-diisocyanate and 4,4',4''-triphenylmethane triisocyanate. Polymeric isocyanates such as polymethylene polyphenylene polyisocyanates can be employed when the absence of color is not a requirement. Other aromatic diisocyanates which are useful include lower alkyl substituted derivatives, and alkoxy derivatives.

Aliphatic diisocyanates such as 3-isocyanate methyl-3,5,5-trimethylcyclohexylisocyanate (IPDI), 4,4'-dicyclohexylmethane diisocyanate, and trimethyl hexamethylene diisocyanate, may also be used. Other aromatic and aliphatic isocyanates, as well as mixtures, may also be used in the prepolymer preparation.

Representative polyols used to react with the isocyanates to form the NCO-terminated prepolymer include castor oil; polyether polyols (i.e., hydroxy terminated) including the adducts of propylene oxide and at least one polyol, the latter being illustrated by propylene glycol, trimethyl propane, 1,2,6-hexane triol, glycerine and pentaerythritol; and polytetramethylene ether glycols.

Commercial grades of castor oil are generally suitable herein for use in the prepolymer formation. Castor oil is a naturally occurring triglyceride of ricinoleic acid and thus contains at least three hydroxy groups. While the composition of castor oil cannot be precisely defined, it is generally accepted that its ester groups are usually 80–92% ricinoleic, 3–7% linoleic, 0–9% oleic and 0–1% palmitic.

Polyol esters derived by reacting dihydric lower aliphatic polyols with aliphatic dicarboxylic acids, anhydrides, or hydroxy carboxylic acids are also suitable for preparing the prepolymer. Representative examples of aliphatic dihydric alcohols suitable for preparing polyol esters include ethylene glycol, propylene glycol, hexylene glycol, diethylene glycol, dipropylene glycol, and hexamethylene glycol. The hydroxy carboxylic acids suitable for preparing polyol esters may be saturated or unsaturated. Illustrative of this class of hydroxy acids include ricinoleic acid, 12-hydroxy stearic acid, hydroxy palmitic acid, hydroxy pentadecanoic acid, hydroxy myristic acid, etc. Illustrative of aliphatic carboxylic acids include adipic, glutaric, pimelic, malonic, fumaric acids and the like.

The preferred polyol esters are derived from ricinoleic acid such as ethylene glycol monoricinoleate.

The isocyanate and polyol typically are reacted at NCO/OH equivalent weight ratio of from about 2:1 to about 12:1, and preferably from about 4:1 to about 7:1.

The preferred NCO-terminated prepolymers are derived from (1) the reaction product of polyoxypropylene glycol, castor oil and diphenylmethane 4,4'-diisocyanate (MDI) and (2) the reaction product of castor oil and 3-isocyanate methyl-3,5,5-trimethylcyclohexylisocyanate (IPDI).

Polyols useful in the second component of the polyurethane forming system include the difunctional polyols and particularly the polyether and polyol esters described in connection with the formation of the NCO-terminated prepolymer. In addition crosslinking agents are employed with an hydroxyl functionality of greater than 2.

Such crosslinking agents are illustrated by polyols which include castor oil in the polymerized and unpolymerized form, glycerine, trimethylol propane, 1,2,6-hexanetriol, and pentaerythritol; polyether polyols including the adducts of propylene oxide and any of the above crosslinking polyols; polyol esters including the adducts of the carboxylic acids, hydroxy carboxylic acid, or anhydride derivatives described in connection with the prepolymer and any of the crosslinking polyols described above.

The preferred polyols employed in the polyol component in conjunction with the preferred NCO-terminated prepolymers include (1) mixtures of ethylene glycol monoricinoleate and polymerized castor oil; and (2) polyoxypropylene adducts of trimethylolpropane.

Polymerized castor oil is the product which results from controlled oxidation of castor oil conducted by intimate mixing or blowing of air or oxygen into the castor oil at temperatures between about 80° and 130° C., with or without the use of a catalyst. The reaction between the oxygen and the castor oil is a combination of oxidation and polymerization. This reaction is promoted by transition metals including iron, copper and manganese. Such polymerized castor oils are well known in the art and are discussed by F. Naughton, F. Duneczky, C. Swenson, T. Kroplinski and M. Cooperman in *Kirk Othmer Encyclopedia of Chemical Technology*, Vol. 5 (3 ed. 1979).

The use of polymerized castor oil promotes the flexibility and chemical resistance of the polyurethanes and also permits easier control of the crosslink density thereof.

Suitable polyoxypropylene adducts of trimethylolpropane are commercially available.

The amount of polyol added to the prepolymer should be sufficient to react with the free isocyanate groups remaining thereon after its preparation but preferably not too low or too large an excess is used. Too low an amount of polyol may result in a cured system which is too hard while excess amounts may result in undesired plasticizer action. The particular amount of polyol required to react properly with the prepolymer can readily be determined by those skilled in the art by known calculations.

Accordingly, the NCO-terminated prepolymer is blended with the polyol at weight ratios of from about 10:90 to about 90:10, preferably from about 20:80 to about 70:30, and most preferably from about 30:70 to about 55:45 respectively in order to achieve an NCO-/OH equivalent weight ratio of from about 0.9:1.4 and preferably about 1.0 to 1.1.

The polyurethane forming compositions of the present invention are typically cured in two stages. In the first stage, referred to herein as the pre-cure, they are subjected to temperatures of from about 25° to about 75° C., and preferably from about 25° to about 50° C. The polyurethane composition is considered to be pre-cured when it has gelled to the point that it will not flow as determined by the gel test discussed in the Examples. The manner in which the resin is pre-cured can vary and will depend on the particular apparatus employed to make the biomedical and industrial filtration separatory devices.

The polyurethane composition is considered to be pre-cured when it has gelled to the point that it will not flow as determined by the test described in the Examples. At room temperature, in the absence of the catalysts, the pre-cure time would ordinarily be in the range of from about 1 hour to several days. The use of a catalyst significantly reduces the gel or precure time (and thus the centrifuge time required in the preparation of separatory devices as described below). Additionally, by a proper selection of the catalyst concentration, it is possible to obtain any desired pre-cure time. Generally, pre-cure times ranging from about 10 to 25 minutes are preferred because these allow enough time for the polyol containing the catalyst in solution and the isocyanate prepolymer to be properly mixed. Higher pre-curing temperatures up to about 75° C. permit increasingly shorter centrifuge times. Room temperature pre-cures are preferred since this results in a substantial savings in energy consumption and cost in the preparation of separatory devices as described below, by reducing the time during which the centrifuge is tied up for each batch of hollow fibers relative to that required in the absence of catalytic material.

After the polyurethane compositions of the present invention has pre-cured, it is generally subjected to a second stage of curing referred to as post-curing. As used herein, the term "post-cured" shall mean polyurethane compositions which have been subjected to temperatures of from about 25° to about 75° C. for time periods of in the range of from about 1 to about 6 hours, preferably from about 1 to about 3 hours. While post-cure time periods can vary depending on concentrations and curing temperatures, a typical post-cure time would be in the neighborhood of about 1.5 hours.

The term "polyurethane forming composition" as used herein is meant to include (a) two component polyurethane forming compositions wherein the first component is at least one NCO-terminated prepolymer and the second component is at least one catalyst-containing polyol and (b) mixtures of the polyol component with an effective catalytic amount of the catalysts described herein.

The polyurethane forming compositions and formed polyurethane compositions of the present invention may optionally include minor amounts of other compounds. However, such compounds are not present in amounts which would deleteriously affect the non-cytotoxic or stable properties of the compositions.

In general, the polyurethane compositions of the present invention are useful in the manufacture and operation of filtration and separation equipment where the possibility of introducing cytotoxic matter, such as residual catalyst composition, into the fluids or materials being treated is to be avoided. This is often the case in filtration and separation equipment used in certain food, drug and cosmetic applications where the fluids being treated will eventually be taken internally or applied externally. This is also the case where the polyurethane compositions are employed as sealing or potting resins in the manufacture of separatory devices used in the biomedical field.

Separatory devices useful in biomedical applications such as kidney dialysis, hemodialysis, hemoultrafiltration, blood oxygenation and the like are well known. Such devices generally consist of at least one separatory membrane or element, disposed in a housing or casing having an inlet and an outlet means. The separatory membrane may take the form of a hollow fiber, film, screen, and the like and is chosen for its ability to perform the intended biomedical function.

Various methods of manufacture of such separatory devices are known. Certain of these methods employ potting or sealing resins to secure the separatory membranes in the housing and prevent the mixing of fluids which pass on either side of the membrane when necessary. The non-toxic polyurethane compositions of the present invention are appropriate for use in such devices, and such devices are an appropriate vehicle for exemplifying the scope of the present invention.

A number of different separatory devices are commonly in use, generally differing in the configuration of the separatory membrane. One type of separatory device typically consists of a plurality of permeable hollow fibers whose terminal portions are potted in a sealing collar and extend therethrough thereby providing liquid access to the interior of the fibers. The separatory elements are then typically sealed within a casing to form a separatory cell having one or more liquid ports which allow for the passage of one fluid, such as blood, through the fibers and another fluid around the fibers without mixing the two fluids. The separatory element may have two sealing collars or a single sealing collar in which latter case the fibers are doubled back so that all the ends terminate together. The general configuration of the separatory element and separatory cell is similar to a tube-and-shell heat exchanger. The sealing collar is typically derived from a resin which is capable of encapsulating the fibers to provide a seal which prevents the fluid inside the hollow fibers from mixing with the fluid outside the fibers.

Patents representative of the art of hollow fiber separatory devices include U.S. Pat. Nos. 2,972,349, 3,228,876, 3,288,877, 3,422,008, 3,423,491, 3,339,341, 3,503,515, 3,551,331 and the like, the disclosures of which are herein incorporated by reference.

A preferred class of resins useful for preparing the sealing collars are flexible polyurethane forming systems as illustrated by U.S. Pat. Nos. 3,962,094 and 4,031,012, the disclosures of which are herein incorporated by reference. Centrifugal casting, as illustrated by U.S. Pat. No. 3,492,698, the disclosure of which is herein incorporated by reference, is a representative method employed for preparing sealing collars. In accordance with such a technique, hollow fibers are fabricated into a substantially parallel bundle of from about 1000 to 20,000 or more fibers by a number of methods. One such method is to wrap a fiber continuously end-to-end onto a mandrel rod with retaining brackets on either end. The substantially parallel fibers are then inserted into a holding device. The holding device containing the fiber bundle is typically placed into a centrifuge-like device which incorporates a potting-material reservoir with tubes connecting it to the end-molds. The mixture of the polyol component containing the catalyst, and the NCO-terminated prepolymer can be mixed and placed into the potting reservoir wherein it is maintained at the precure temperatures described above, and the entire assembly then rotated to provide a 2 to 200 g force nearly parallel to the fiber bundle. The resin is forced down the connecting tubes by the g force and flows around and among the fibers in the end-molds. The end molds can optionally also be heated to the above-described pre-cure temperatures. The process is continued until the reservoir is devoid of resin. Alternatively, the potting material can be placed into the holding device at room tempertature and forced into the end molds which are heated to the above-described pre-cure temperatures.

The rotation is continued until the polyurethane is gelled, i.e., has set to a non-flowable state.

After the polyurethane has pre-cured (i.e., gelled) the fiber bundle is removed and the unit placed in an oven for the second stage of curing referred to herein as post-curing. Post-curing temperatures can vary from about 25° C. to about 75° C., and preferably from about 45° to about 65° C. (e.g., 50° C.). Post-curing times can vary from about 1 to about 6 hours, and preferably from about 1 to about 3 hours at the above-described post-curing temperatures. These post-curing times are significantly reduced from post-curing times in the absence of a catalyst.

Alternatively, pre-curing and post-curing can be achieved in a single stage by permitting the resin to remain at room temperature for a period of about 1 to about 14 days (e.g. 7 days).

After post-curing, the end-molds are then displaced and the potted fibers are opened by cutting through the sealing collar perpendicular to the fiber bundle. A bundle results wherein the potted end or ends demonstrate structural intergrity and round, open fibers.

While the present discosure has been appropriately exemplified with reference to hollow fiber separatory devices which employ the non-cytotoxic, hydrolytically stable polyurethane forming compositions and formed polyurethane compositions of the present invention, the present invention also contemplates the use of the aforementioned catalyzed polyurethane compositions in conjunction with the above-described curing temperatures and times in any separatory device to be used in biomedical applications which requires the sealing of a separatory membrane in a non-cytotoxic potting resin, e.g., blood filters, intra-venous (IV) solution filters, anesthesia filters, total nutritional feeding filters and in-line peritoneal dialysis filters. The term "separatory membrane" as employed herein characterizes the configurations into which a substance can be provided to perform the function of selecting, filtering, or separating one material from a medium containing the same and includes such configurations, in addition to hollow fibers, as films, screens, foams, sponges, and the like.

Such separatory devices include those which can be employed as blood transfusion filters, such as depth filters, screen filters, and combination depth and screen filters. In the depth type filter, blood passing through the interstices of the filter is exposed to a large foreign surface, and microaggregates in the blood (e.g. platelets, white cells, and matted fibrin) are removed by adhesion to the filtering medium. Screen type filters effect filtration by sieving, i.e., by mechanically obstructing passage of particles larger than the screen pore size. The combination type filters combine the filtration modes of both depth and screen filters. Representative separatory membranes which can be employed in such blood transfusion devices include those prepared from Dacron wool, polyester mesh, polyurethane sponge and foam, nylon wool and the like. Each of these separatory membranes can be secured in a filter housing using the catalyzed polyurethane resins described herein.

Another broad group of separatory devices employing separatory membranes which can be potted or sealed with the catalyzed polyurethanes described herein are those which employ permeable or selectively permeable films. The identity of the composition of such films is selected in accordance with well-known requirements for their ability to perform an intended function such as blood oxygenation, kidney dialysis, and the like. Such devices typically comprise a plurality of membranes disposed in a spaced relationship in opposition to one another, e.g., in a substantially parallel, pleated, concentric or spiral surface-to-surface array, so as to define both a first group of flow volumes (e.g., to permit the flow of blood) and a second group of flow volumes (e.g., to permit the flow of a treating fluid). The members of the second group of flow volumes are disposed in alternating relationship with the members of the first group. Each flow volume contains membrane-spacing means (e.g., a woven screen) to support the membranes which define the two groups of flow volumes.

Means are provided for simultaneously defining the periphery of each of said flow volumes and for bonding together adjacent membrane assemblies, and the spacing means located therebetween to form gastight peripheral walls. In the present invention such means comprise the catalyzed polyurethane described herein. The techniques for employing the potting resin in such devices are well known in the art.

Means are all provided for separate access to and egress from the first and second group of flow volumes. The access and egress means, which typically take the form of discontinuous channels, place at least two adjacent flow volumes of the same group in flow communication. The entire assembly is located in, or defines, a housing with a feed inlet and a feed outlet in flow communication with the access and egress means, respectively, of each group of flow volumes.

Representative patents which illustrate such separatory devices include U.S. Pat. Nos. 3,879,293, 3,907,687 and 3,925,037, the disclosures of which are herein incorporated by reference.

The present invention also contemplates use of the aforementioned catalyzed polyurethane compositions in, e.g., the following applications: as adhesives and coatings for arterial and venous catheters; as adhesives, sealants, encapsulants and/or potting compounds for membrane plasmapheresis devices; in the manufacture and operation of blood heat exchangers; as gaskets for filtration and other separation equipment or devices used in food, drug and cosmetic applications; and as adhesive, end-cap compounds or potting compounds in industrial or commercial disposable cartridge filters where compounds having the desirable properties disclosed herein are required.

The invention is additionally illustrated in connection with the following Example, which is to be considered to be illustrative of the present invention. It should be understood, however, that the invention is not limited to the specific details of the Example. All parts and percentages in the claims and in the remainder of the specification are by weight unless otherwise specified.

EXAMPLE

In accordance with the detailed description set forth below, a number of prepolymers, polyols and hydrolytically stable catalyst compositions are prepared for use in preparation of polyurethane forming systems and formed non-cytotoxic polyurethane compositions within the scope of this invention. For the purposes of comparison, a number of systems and compositions are prepared which are outside the scope of the present invention. Generally these compositions are characterized by their cytotoxicity or instability, as defined herein.

PREPARATION OF PREPOLYMER A

A mixture of 179.8 grams of polyoxypropylene glycol having a number average molecular weight of about 400, 85.4 grams of castor oil and 735.6 grams of diphenylmethane 4,4'-diisocyanate (MDI) are charged to a reactor. The temperature of the mixture is raised to about 75° C. under nitrogen and agitation and maintained for 2 hours at about 70°-80° C., cooling when necessary. The resulting prepolymer, after cooling to about 25° C., had an NCO content of about 20.0% and a viscosity of about 4,000 cps as determined by a Brookfield viscometer.

PREPARATION OF PREPOLYMER B

In accordance with the procedure described in the preparation of the Prepolymer A, a second prepolymer is prepared by reacting 342 grams of castor oil with 556 grams of 3-isocyanate methyl-3,5,5-trimethylcyclohexylisocyanate (IPDI). The resulting Prepolymer B had an NCO content of about 18.7% and a viscosity of about 2,000 cps as determined by a Brookfield viscometer.

PREPARATION OF POLYOL a

A mixture of 853.2 grams of ethylene glycol monoricinoleate and 346.8 grams of polymerized castor oil are charged to a reactor. The mixture is heated to about 60° C., under a vacuum of at least 10 mm Hg and agitation, for one hour and then cooled to room temperature under nitrogen.

POLYOL b

This polyol is a commercially available polyoxypropylene adduct of trimethylolpropane, with an average molecular weight of about 1500 and an hydroxyl number of about 100, obtained from BASF Wyandotte Co.

CATALYST PREPARATION

The catalysts of the invention are prepared by conventional procedures. A preferred procedure would involve the reaction of the dialkyltin oxide with the desired carboxylic acid at temperatures from 20° C. to 100° C. under vacuum for a sufficient time to allow the reaction to go to completion.

EVALUATION OF CATALYTIC EFFICIENCY, CYTOTOXICITY, SOLUTION STABILITY AND HYDROLYTIC STABILITY

Catalytic Efficiency

Catalytic efficiency is evaluated in a number of polyurethane systems, as described in the following manner:

Polyurethane System (Aa)

The polyurethane system (Aa) comprised:
The prepolymer (A): an isocyanate terminated prepolymer based on diphenylmethane 4,4'-diisocyanate (MDI), polyoxypropylene glycol and castor oil, prepared in the manner described above.
The polyol (a): a polyol based on modified castor oil, prepared in the manner described above.
Polyol solutions containing catalysts at various concentrations are prepared by mixing and heating the mixtures at about 60° C. for about 30 minutes. This was done to ensure complete and uniform solution. After cooling to about 25° C., 50.2 grams of polyol containing the catalyst is mixed thoroughly with 49.8 grams of the prepolymer and deaerated under vacuum. The equivalent ratio of isocyanate terminated prepolymer to polyol is about 1.1 to 1.

50 grams of this mixture is then placed in a vessel and the gel time, non-flow time and demold time are determined at about 25° C. in the manner set forth below.

Polyurethane System (Ba)

The polyurethane system (Ba) comprised:
The prepolymer (B): the isocyanate terminated prepolymer based on isophorone diisocyanate (IPDI) and castor oil prepared in the manner described above.
The polyol (a).
Polyol solutions containing catalysts at various concentrations are prepared as described in the polyurethane system (Aa). 50.7 grams of polyol containing the catalyst is thoroughly mixed with 49.3 grams of the prepolymer. The equivalent ratio of isocyanate terminated prepolymer to polyol is about 1.1 to 1. 50 grams of this mixture is placed in a vessel and the gel time, non-flow time and demold time are determined at about 25° C., again in the manner set forth below.

Polyurethane System (Bb)

The polyurethane system (Bb) comprised:
The prepolymer (B).
The polyol (b).
Polyol solutions containing catalysts at various concentrations are prepared as described in the polyurethane system (Aa). 68.2 Grams of the polyol containing the catalyst is thoroughly mixed with 31.8 grams of the isocyanate terminated prepolymer. The equivalent ratio of isocyanate terminated prepolymer to polyol is about 1.1 to 1. 50 Grams of this mixture is placed in a vessel and the gel time, non-flow time and demold time are determined at about 25° C., again in the manner set forth below.

The gel time (i.e., dry stick gel time) is determined in accordance with the ASTM D2471, which is incorporated herein by reference, and is measured from the point of mixing of the two components.

The non-flow time is measured as the time from the point of mixing of the two components to the point at which the polyurethane does not flow on the sides of the vessel in which it is contained (e.g., a 50 cc polypropylene beaker) when held in a horizontal position.

The demold time is measured as the time from the point of mixing of the two components to the point at which the polyurethane can be removed from the vessel and will not deform, is relatively tack-free and has a Shore A Durometer hardness of about 70.

Cytotoxicity Test

Samples of the polyurethane systems (Aa), (Ba) and (Bb), described above, were catalyzed at various concentration levels. The samples were cured at room temperature, post-cured for one week at the same temperature and then tested for their cytotoxicity utilizing the L-929 cell culture test (Test # MG23-01) by the North American Science Assoc., Inc., Northwood, Ohio.

Specifically, this test involves the following procedure: A 4.0 gram sample of the particular catalyzed polyurethane system is employed. A monolayer of L-929 Mouse Fibroblast cells is grown to confluency and exposed to an extract of the test sample prepared by placing the sample material in 20 ml of Minimum Essential Medium (Eagle) [MEM] and fetal bovine serum (5%) and extracting at 37° C. for three consecutive 24 hour periods. An MEM aliquot is used as a negative control. After exposure to the extract, the cells are examined microscopically for cytotoxic effect. As used in the specification and claims herein, the term "non-cytotoxic" shall mean a polyurethane forming composition or a formed polyurethane composition which indicates a negative or non-toxic response after an exposure period of 72 hours to the conditioning set forth immediately above.

Solution Stability and Hydrolytic Stability in Polyols

Various catalyst compositions employed in the present invention are evaluated for solubility and stability characteristics in the castor oil-derived polyol [Polyol (a)] and the propylene oxide-based polyol [Polyol (b)]. As discussed above, the properties of being soluble in the various polyols and remaining in solution even when the polyol is exposed to freezing temperatures and of maintaining catalytic efficiency over extended periods of time are significant properties which allows the preparation of polyol solutions containing the catalyst soon after their preparation and storage of the solutions for long periods of time before use. Polyols containing the catalyst in solution are economically advantageous, allowing use of a complete polyurethane system in two packages (isocyanate terminated prepolymer and polyol/catalyst solution) instead of three (polyol, isocyanate terminated prepolymer and catalyst).

Solution Stability

A 5% solution of the catalyst being evaluated in the Polyol (a) is prepared by dissolving 5 grams of the catalyst in 95 grams of the polyol. As discussed above, for polyurethane systems comprising this polyol and MDI-based prepolymers, such catalyst concentrations are generally too high. For those polyurethane systems comprising the isophorone diisocyanate based prepolymer such concentrations are acceptable. The mixture of the catalyst and polyol are heated to about 60° C. under agitation and kept at this temperature for about 30 minutes. After cooling to about 25° C., the solution is visually examined for clarity and stability. The solution temperature is then lowered to about −10° C. and maintained at that temperature for a 24 hour period. At the end of this period, the solution was allowed to warm up to about 20°–25° C. and observed again for its visual clarity and stability.

Following the same procedure, a 5% solution of the certain catalysts in the Polyol (b) are prepared and evaluated for solution stability.

Polyol/catalyst solutions are also evaluated for solution stability as 0.2% solutions (i.e., a 0.2% solution of catalyst in Polyol (a) or in Polyol (b)).

The term "solution stable" as used herein is meant to include those polyol/catalyst mixtures which are visually clear and stable in accordance with the above test.

Hydrolytic Stability

A sample of catalyst is dissolved in 400 grams of the Polyol (a) containing a predetermined amount of water, by heating under agitation to about 60° C. and maintaining the solution at that temperature for about 30 minutes. After cooling to about 25° C., a 30 gram portion of this solution is mixed with 29.8 g of the prepolymer (A). 50 grams of this mixture is placed in a vessel and the gel time, non-flow time and demold time determined according to the methods described above.

The remaining polyol solution of the catalyst is divided into six bottles, sealed and maintained at a constant temperature of about 60° C. One week later and every week thereafter for the six weeks, one bottle of the polyol solution is cooled to about 25° C. 30 grams of this solution is then mixed with 29.8 grams of the prepolymer (A) and the gel time, non-flow time and demold time determined.

Hydrolytic stability in Polyol (b) is determined in a similar manner.

The term "hydrolytically stable" as used herein is meant to include those polyol/catalyst mixtures which maintain essentially constant gel times, non-flow times and demold times in accordance with the procedure set forth above.

The term "stable" as used herein in the specification and claims is meant to include those polyol/catalyst mixtures which are both solution stable and hydrolytically stable.

Results of Catalytic Efficiency Evaluation

A number of polyurethane compositions are evaluated for catalytic efficiency. The results are summarized below in Table I. The appropriate polyurethane compositions and components thereof are set forth, as well as gel times, non-flow times and demold times. Runs 1, 9, 15, 20, 28, 32, 36 and 40 serve as controls and consequently no catalyst is added to the polyol components and no catalyst is present in the final polyurethane compositions.

TABLE I

| Run No. | Catalyst | Prepolymer | Polyol | Catalyst Conc. % In Polyol | In Urethane System | Gel Time (min.) | Non-Flow Time (min.) | Demold Time (min.) |
|---|---|---|---|---|---|---|---|---|
| 1 | control | A | a | 0.00 | 0.00 | 65.0 | 72.0 | 180 |
| 2 | DOSnR | A | a | 0.25 | 0.1255 | 11.5 | 13.5 | 19 |
| 3 | DOSnR | A | a | 0.20 | 0.1004 | 13.0 | 20.0 | 30 |
| 4 | DOSnR | A | a | 0.175 | 0.0878 | 15.7 | 22.0 | 36 |
| 5 | DOSnR | A | a | 0.14 | 0.0703 | 19.5 | 27.0 | 40 |
| 6 | DOSnR | A | a | 0.11 | 0.0552 | 30.0 | 47.0 | 63 |
| 7 | DOSnR | A | a | 0.10 | 0.0502 | 34.0 | 50.0 | 70 |
| 8 | DOSnR | A | a | 0.09 | 0.0452 | 38.5 | 53.0 | 75 |
| 9 | control | B | a | 0.0 | 0.0 | >7 days | >7 days | >7 days |
| 10 | DOSnR | B | a | 5.0 | 2.535 | 19.7 | 25 | 40 |
| 11 | DOSnR | B | a | 2.0 | 1.014 | 52.7 | 100 | 320 |
| 12 | DOSnR | B | a | 1.5 | 0.7605 | 64.15 | 235 | >480 |
| 13 | DOSnR | B | a | 1.0 | 0.507 | 71.10 | 391.5 | >480 |
| 14 | DOSnR | B | a | 0.5 | 0.2535 | 164.0 | >480 | >480 |
| 15 | control | B | b | 0.0 | 0.0 | >7 days | >7 days | >7 days |

TABLE I-continued

| Run No. | Catalyst | Pre-polymer | Polyol | Catalyst Conc. % In Polyol | In Urethane System | Gel Time (min.) | Non-Flow Time (min.) | Demold Time (min.) |
|---|---|---|---|---|---|---|---|---|
| 16 | DOSnR | B | b | 5.0 | 3.4100 | 60 | 72 | 120 |
| 17 | DOSnR | B | b | 2.0 | 1.3640 | 70 | 100 | 150 |
| 18 | DOSnR | B | b | 1.5 | 1.0230 | 110 | 150 | 180 |
| 19 | DOSnR | B | b | 1.0 | 0.0682 | >180 | >180 | >180 |
| 20 | control | A | a | 0.0 | 0.0 | 65.0 | 72 | >180 |
| 21 | DDSnR | A | a | 0.40 | 0.2008 | 14.1 | 15.5 | 30 |
| 22 | DDSnR | A | a | 0.30 | 0.1506 | 14.2 | 15.4 | 30 |
| 23 | DDSnR | A | a | 0.25 | 0.1255 | 14.4 | 16.0 | 30.5 |
| 24 | DDSnR | A | a | 0.20 | 0.1004 | 15.6 | 19.0 | 35 |
| 25 | DDSnR | A | a | 0.175 | 0.0879 | 20.4 | 28.5 | 47 |
| 26 | DDSnR | A | a | 0.14 | 0.0703 | 22.4 | 32.6 | 50 |
| 27 | DDSnR | A | a | 0.11 | 0.0522 | 26.0 | 40.5 | 65 |
| 28 | control | A | a | 0.0 | 0.0 | 65.0 | 72 | >180 |
| 29 | DOSnS | A | a | 0.2 | 0.1004 | 14.5 | 20.2 | 40 |
| 30 | DOSnS | A | a | 0.15 | 0.0753 | 16.7 | 21.9 | 42 |
| 31 | DOSnS | A | a | 0.12 | 0.0602 | 32 | 54.2 | 120 |
| 32 | control | A | a | 0.0 | 0.0 | 65.0 | 72 | >180 |
| 33 | DOSnOl | A | a | 0.2 | 0.1004 | 14.5 | 19.4 | 40 |
| 34 | DOSnOl | A | a | 0.15 | 0.0753 | 14.75 | 19.6 | 40 |
| 35 | DOSnOl | A | a | 0.12 | 0.0602 | 31.3 | 50.4 | 120 |
| 36 | control | A | a | 0.0 | 0.0 | 65 | 72 | 180 |
| 37 | DOSnL | A | a | 0.2 | .1004 | 13 | 15 | 33 |
| 38 | DOSnL | A | a | 0.15 | 0.0753 | 16 | 21.5 | 40 |
| 39 | DOSnL | A | a | 0.12 | 0.0602 | 19 | 23.5 | 50 |
| 40 | control | A | a | 0.0 | 0.0 | 65.0 | 72 | >180 |
| 41 | DOSnC | A | a | 0.2 | 0.1004 | 9.7 | 10.8 | 19 |
| 42 | DOSnC | A | a | 0.15 | 0.0753 | 12.0 | 14.5 | 25 |
| 43 | DOSnC | A | a | 0.12 | 0.0602 | 14.3 | 17.1 | 32 |

DOSnR = Dioctyltin diricinoleate
DDSnR = Didodecyltin diricinoleate
DOSnS = Dioctyltin-di-12-hydroxy-stearate
DOSnOl = Dioctyltin dioleate
DOSnL = Dioctyltin dilaurate
DOSnC = Dioctyltin-di-6-hydroxy caproate As may be seen from the results set forth in Table I above, significant decreases in gel times, non-flow times and demold times are generally observed in the polyurethane formation reactions employing the polyurethane-forming compositions of the present invention, when compared to the control runs. These decreases are indicative of increased or accelerated reaction rates in the polyurethane formation reaction, which in turn allows for shorter and more economical production cycles.

Results of Cytotoxicity Evaluation

A number of polyurethane compositions are evaluated for cytotoxic effect. The results are summarized below in Table II. The appropriate polyurethane compositions and components thereof are set forth, as well as cytotoxicity results. Runs 44, 57 and 66 serve as controls and consequently no catalyst is added to the polyol components and no catalyst is present in the final polyurethane compositions.

TABLE II

| Run No. | Catalyst | Pre-polymer | Polyol | Catalyst Conc. % In Polyol | In Urethane System | Curing Temperature (°C.) | Cytotoxicity |
|---|---|---|---|---|---|---|---|
| 44 | control | A | a | 0.0 | 0.0 | 25° | non-cytotoxic |
| 45 | DOSnR | A | a | 0.2988 | 0.15 | 25° | non-cytotoxic |
| 46 | DOSnR | A | a | 0.2191 | 0.11 | 25° | non-cytotoxic |
| 47 | DOSnR | A | a | 0.1394 | 0.07 | 25° | non-cytotoxic |
| 48 | DOSnR | A | a | 0.0697 | 0.035 | 25° | non-cytotoxic |
| 49 | DBSnR | A | a | 0.2988 | 0.15 | 25° | cytotoxic |
| 50 | DBSnR | A | a | 0.2191 | 0.11 | 25° | non-cytotoxic |
| 51 | DBSnR | A | a | 0.1394 | 0.07 | 25° | non-cytotoxic |
| 52 | DBSnR | A | a | 0.0697 | 0.035 | 25° | non-cytotoxic |
| 53 | DBSnL | A | a | 0.29888 | 0.15 | 25° | cytotoxic |
| 54 | DBSnL | A | a | 0.2191 | 0.11 | 25° | cytotoxic |
| 55 | DBSnL | A | a | 0.1394 | 0.07 | 25° | non-cytotoxic |
| 56 | DBSnL | A | a | 0.0697 | 0.035 | 25° | non-cytotoxic |
| 57 | control | B | a | 0.0 | 0.0 | 40° | non- |

TABLE II-continued

| Run No. | Catalyst | Pre-polymer | Polyol | Catalyst Conc. % In Polyol | Catalyst Conc. % In Urethane System | Curing Temperature (°C.) | Cytotoxicity |
|---|---|---|---|---|---|---|---|
| 58 | DOSnR | B | a | 4.93 | 2.5 | 25° | cytotoxic |
| 59 | DOSnR | B | a | 2.465 | 1.25 | 25° | non-cytotoxic |
| 60 | DOSnR | B | a | 1.18 | 0.6 | 25° | non-cytotoxic |
| 61 | DOSnR | B | a | 1.18 | 0.6 | 15° | non-cytotoxic |
| 62 | DBSnR | B | a | 3.94 | 2.0 | 25° | non-cytotoxic |
| 63 | DBSnR | B | a | 1.97 | 1.0 | 25° | cytotoxic |
| 64 | DBSnR | B | a | 0.79 | 0.4 | 25° | cytotoxic |
| 65 | DBSnR | B | a | 0.79 | 0.4 | 15° | cytotoxic |
| 66 | control | B | b | 0.0 | 0.0 | 40° | cytotoxic |
| 67 | DOSnR | B | b | 5.13 | 3.5 | 25° | non-cytotoxic |
| 68 | DOSnR | B | b | 2.57 | 1.75 | 25° | non-cytotoxic |
| 69 | DOSnR | B | b | 1.47 | 1.0 | 25° | non-cytotoxic |
| 70 | DOSnR | B | b | 1.47 | 1.0 | 15° | non-cytotoxic |
| 71 | DBSnR | B | b | 4.4 | 3.0 | 25° | cytotoxic |
| 72 | DBSnR | B | b | 2.2 | 1.5 | 25° | cytotoxic |
| 73 | DBSnR | B | b | 1.1 | 0.75 | 25° | cytotoxic |
| 74 | DBSnR | B | b | 1.1 | 0.75 | 15° | cytotoxic |
| 75 | DOSnL | A | a | 0.2988 | 0.15 | 25° | cytotoxic |
| 76 | DOSnOl | A | a | 0.2988 | 0.15 | 25° | non-cytotoxic |
| 77 | DDSnR | A | a | 0.2988 | 0.15 | 25° | non-cytotoxic |
| 78 | DOSnC | A | a | 0.2988 | 0.15 | 25° | non-cytotoxic |
| 79 | DOSnL | B | a | 4.93 | 2.5 | 25° | cytotoxic |
| 80 | DOSnOl | B | a | 4.93 | 2.5 | 25° | non-cytotoxic |
| 81 | DDSnR | B | a | 4.93 | 2.5 | 25° | non-cytotoxic |
| 82 | DOSnC | B | a | 4.93 | 2.5 | 25° | non-cytotoxic |
| 83 | DOSnL | B | b | 5.13 | 3.5 | 25° | cytotoxic |
| 84 | DOSnOl | B | b | 5.13 | 3.5 | 25° | non-cytotoxic |
| 85 | DDSnR | B | b | 5.13 | 3.5 | 25° | non-cytotoxic |
| 86 | DOSnC | B | b | 5.13 | 3.5 | 25° | cytotoxic |

DOSnR = Dioctyltin diricinoleate
DBSnR = Dibutyltin diricinoleate
DBSnL = Dibutyltin dilaurate
DOSnL = Dioctyltin dilaurate
DOSnOl = Dioctyltin dileate
DDSnR = Didodecyltin diricinoleate
DOSnC = Dioctyltin-di-6-hydroxy caproate As may be seen from the results set forth in Table II above, certain polyurethane compositions are found to be non-cytotoxic at certain catalyst concentration levels but cytotoxic at other generally higher catalyst concentrations. It is the nature of the present invention that certain polyurethane compositions are within the scope of the invention at certain catalyst component concentrations, presuming that such compositions satisfy the other requirements of the appended claims, but that the same polyurethane compositions containing higher catalyst concentrations may fall outside the scope of the present invention and be cytotoxic.

On the other hand, certain preferred polyurethane compositions incorporate catalyst components such that the polyurethanes are always non-cytotoxic within the contemplated ranges of catalyst concentrations. For example, the polyurethane compositions including dioctylthin-diricinoleate catalyst are non-cytotoxic at all catalyst component concentrations tested. The claims appended hereto are meant to encompass those situations where non-cytotoxic results are obtained and where the other required parameters set forth in the claims are satisfied.

Results of Hydrolytic Stability Evaluation

A number of polyurethane systems and corresponding catalyst/polyol solutions were evaluated for hydrolytic stability. The results are summarized below in Table III. The appropriate polyurethane systems and catalyst/polyol solutions are set forth, as well as gel times, non-flow times and demold times evaluated at one week intervals for a period of six weeks.

(a) Hydrolytic Stability of dioctyltin-diricinoleate in Polyol (a)

(1) Polyol (a) containing 0.0081% water 0.56 grams of dioctylthin-diricinoleate is dissolved in 400 grams of polyol (a) containing 0.0081% water, by heating under agitation to about 60° C. and keeping the solution at that temperature for 30 minutes. After cooling to about 25° C., a 30 gram portion of this solution is mixed with 29.8 grams of the prepolymer (A). 50 grams of this mixture is placed in a vessel and the gel-time, non-flow time and demold time are determined according to the appropriate methods set forth above.

The remaining polyol solution of the catalyst is divided into six bottles, sealed and maintained at a constant temperature of about 60° C. One week later and every week thereafter during a six week period, one bottle of the polyol solution is cooled to about 25° C. 30 grams of this solution is then mixed with 29.8 grams of the prepolymer (A) and the gel time, non-flow time and demold time are determined.

The results are summarized in Table III below.

TABLE III

| Period of Time Polyol Solution Maintained at About 60° C. | Gel time (minutes) | Demold Non-flow time (minutes) | Time (minutes) |
| --- | --- | --- | --- |
| Initial evaluation | 22.65 | 30 | 45 |
| 1 week | 22.8 | 31 | 45 |
| 2 weeks | 23.3 | 34.3 | 50 |
| 3 weeks | 23.3 | 34 | 50 |
| 4 weeks | 21.45 | 29.2 | 45 |
| 5 weeks | 19.0 | 25 | 40 |
| 6 weeks | 21.0 | 30 | 45 |

(2) Polyol (a) containing 0.0554% water

A 0.14% solution of dioctyltin-diricinoleate in polyol (a), the polyol this time containing 0.0554% water, is prepared and the hydrolytic stability is evaluated as described above in (a) (1).

The results are summarized in Table IV below.

TABLE IV

| Period of Time Polyol Solution Maintained at About 60° C. | Gel time (minutes) | Demold Non-flow time (minutes) | Time (minutes) |
| --- | --- | --- | --- |
| Initial evaluation | 19.0 | 27 | 40 |
| 1 week | 19.5 | 27.2 | 41 |
| 2 weeks | 20.0 | 27.6 | 45 |
| 3 weeks | 20.0 | 30 | 50 |
| 4 weeks | 21.5 | 31 | 52 |
| 5 weeks | 21.0 | 32 | 50 |
| 6 weeks | 18.7 | 26 | 46 |

(3) Polyol (a) containing 0.1033% water

A 0.14% solution of the catalyst in the Polyol (a), the polyol this time containing 0.1033% water, is prepared and the hydrolytic stability is evaluated as described in (a) (1).

The results are summarized in Table V below.

TABLE V

| Period of Time Polyol Solution Maintained at About 60° C. | Gel time (minutes) | Demold Non-flow time (minutes) | Time (minutes) |
| --- | --- | --- | --- |
| Initial evaluation | 16.6 | 24 | 35 |
| 1 week | 20 | 29 | 40 |
| 2 weeks | 20.3 | 26 | 40 |
| 3 weeks | 21.85 | 25.85 | 45 |
| 4 weeks | 20.2 | 27.15 | 45 |
| 5 weeks | 22.8 | 30.15 | 48 |
| 6 weeks | 21 | 25.6 | 40 |

(b) Hydrolytic Stability of Dioctyltin-diricinoleate in Polyol (b)

(1) Polyol (b) containing 0.0466% water 0.52 Grams of dioctyltin-diricinoleate is dissolved in 400 grams of polyol (b) containing 0.0466% water, by heating to about 60° C. under agitation and keeping the solution at that temperature for 30 minutes. After cooling to about 25° C., a 44 gram portion of this solution is mixed with 18.86 grams of an isocyanate terminated prepolymer based on diphenylmethane 4-4'-diisocyanate and polypropylene oxide (equivalent ratio 1.1 to 1, isocyanate terminated prepolymer to polyol). 50 Grams of this mixture was placed in a vessel and the gel time, non-flow time and demold time are determined according to the appropriate method set forth above.

The remaining polyol solution of the catalyst is divided into six bottles, sealed and placed in an oven at about 60° C. One week thereafter and every week thereafter during a six week period, one bottle of the polyol solution is cooled to about 25° C. 44 grams of this solution is then mixed with 18.86 grams of prepolymer and gel time, non-flow time and demold time are determined.

The results are summarized in Table VI below.

TABLE VI

| Period of Time Polyol Solution Maintained at About 60° C. | Gel time (minutes) | Demold Non-flow time (minutes) | Time (minutes) |
| --- | --- | --- | --- |
| Initial evaluation | 12 | 14 | 20 |
| 1 week | 12.5 | 13.5 | 18 |
| 2 weeks | 12.5 | 15.5 | 18.1 |
| 3 weeks | 15.25 | 17.35 | 20.5 |
| 4 weeks | 27.45 | 31.6 | 40 |
| 5 weeks | 27.2 | 31 | 38 |
| 6 weeks | 28 | 31 | 38 |

(2) Polyol (b) containing 0.0093% of water 0.4 Grams of dioctyltin-diricinoleate is dissolved in 400 grams of polyol (b), the polyol this time containing 0.0093% water. The hydrolytic stability is then evaluated as described above in (b) (1).

The results are summarized in Table VII below.

TABLE VII

| Period of Time Polyol Solution Maintained at About 60° C. | Gel time (minutes) | Demold Non-flow time (minutes) | Time (minutes) |
| --- | --- | --- | --- |
| Initial evaluation | 24.40 | 28 | 37 |
| 1 week | 21 | 25 | 33 |
| 2 weeks | 22.20 | 25 | 33 |

TABLE VII-continued

| Period of Time Polyol Solution Maintained at About 60° C. | Gel time (minutes) | Demold Non-flow time (minutes) | Time (minutes) |
|---|---|---|---|
| 3 weeks | 19.30 | 21 | 28 |
| 4 weeks | 21 | 25.30 | 32 |
| 5 weeks | 19.35 | 22.35 | 28.05 |
| 6 weeks | 27.0 | 33 | 36 |

The results of the hydrolytic stability tests as set forth above indicate that even under the conditions set forth therein (which are considered to be severe when compared to anticipated commercial shipment and storage conditions), the polyurethane forming compositions, i.e., the polyol/catalyst mixtures encompassed by the present invention are very stable and generally retain excellent catalytic efficiency over extended periods of time. In certain instances, e.g., in polyol/catalyst mixtures of polyol (b) and dioctyltin-diricinoleate with higher water contents, e.g., about 0.05% water in polyol, mixtures may exhibit losses in catalytic activity after extended periods of time. However, even in such situations, the somewhat decreased catalytic efficiency is considered to be useful for the purposes of the present invention, and the catalyst component is still considered active.

RESULTS OF SOLUTION STABILITY EVALUATION

A sample of dioctyltin-diricinoleate is evaluated for its solubility characteristics and solution stability in polyol (a) and polyol (b). A 5% solution of the dioctyltin-diricinoleate catalyst in polyol (a) is prepared by dissolving 5 grams of the catalyst in 95 grams of the polyol. The mixture of the catalyst and polyol is heated to about 60° C. under stirring and kept at this temperature for 30 minutes. After cooling to about 25° C. the solution is still visually clear and appears stable. The solution is then placed in the freezer compartment of a refrigerator, kept at a temperature of about −10° C. for a 24 hour period. At the end of this period, the solution is allowed to warm up to room temperature about 20°–25° C. and visually observed again for its clarity. The solution is clear and stable.

Following the same procedure, a 5% solution of the same catalyst in the Polyol (b) is prepared and visually observed for its stability. Again the test appears clear and stable.

A sample of didodecyltin-diricinoleate is evaluated for its solubitity characteristics and solution stability in the Polyols (a) and (b) in the manner set forth above. The solutions are visually clear and stable even at concentrations of 5%.

A sample of dioctyltin-di-12-hydroxystearate is evaluated for its solubility characteristics and solution stability in the Polyols (a) and (b) in the manner set forth above.

The solutions of the catalyst in the Polyol (a) are stable and clear even at the concentration of 5%. In the Polyol (b) the catalyst precipitates out of the solutions when cooled to room temperature, even at concentrations of 0.2% based on the polyol.

A sample of dioctyltin-distearate is evaluated in the manner set forth above in the polyol (a) and (b) by heating various mixtures of catalyst and polyol to 60° C.

All of the solutions prepared in both polyols are clear at 60° C. However, upon cooling to room temperature the catalyst precipitates out of the solutions, even at concentrations of 0.2%.

A sample of dioctyltin-dilaurate is also evaluated in the manner set forth above in polyols (a) and (b).

The 5% solutions in the polyols (a) and (b) are clear at 60° C. but cloudy at room temperature.

Solutions in the same polyols but at the concentration of 0.5% are clear at room temperature.

A sample of dioctyltin-di-6-hydroxy caproate is evaluated in polyols (a) and (b) in the manner set forth above. The solutions are visually clear and stable even at concentrations of 5%.

A sample of dioctyltin-dioleate is evaluated in the manner set forth above in the Polyols (a) and (b).

The 5% solutions in the Polyol (a) are visually clear and stable. The solutions in the Polyol (b) are cloudy, even at concentrations of 0.2% based on the polyol.

As may be seen from the results set forth above, certain polyol/catalyst mixtures found to be solution stable at certain catalyst concentration levels but unstable at other concentrations. Additionally, as may be seen from the above results, certain catalysts were solution stable in a particular polyol but not in others. Again, it is the nature of the present invention that certain polyol/catalyst mixtures are themselves within and may be employed within the scope of the present invention, presuming that the other requirements of the appended claims are satisfied, but that at different concentrations, the polyol/catalyst mixtures may fall outside the scope of the present invention as being unstable.

On the other hand, certain preferred polyol/catalyst mixtures are always solution stable within the contemplated range of catalyst concentrations. The claims appended hereto are meant to encompass those situations where solution stable results are obtained and where the other required parameters set forth in the claims are satisfied.

What is claimed is:

1. A two component polyurethane forming composition which is non-cytotoxic when cured consisting essentially of:
 (a) as a first component at least one NOC-terminated prepolymer;
 (b) as a second component of at least one polyol; and
 (c) an effective catalytic amount of a dialkyltin dicarboxylated compound having the formula:

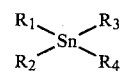

wherein:
 R1 and R2 are linear or branched alkyl groups having from about 8 about 18 carbon atoms per molecule; and
 R3 and R4 represent carboxylate groups derived from (a) one or more saturated or unsaturated, linear or barnched, aliphatic hydroxy-carboxylic acids having from about 2 to about 18 carbon atoms per molecule; (b) one or more saturated and unsaturated, linear or branched, aliphatic carboxylic acids having from about 14 to about 20 carbon atoms per molecule; and (c) mixtures of (a) and (b);

and wherein said dialkyltin dicarboxylated compound is incorporated into said second component prior to curing and is stable therein.

2. The polyurethane forming composition of claim 1 wherein $R_1$ and $R_2$ are the same.

3. The polyurethane forming composition of claim 2 wherein (1) the NCO-terminated prepolymer is the reaction product of (a) at least one polyol selected from the group consisting of polyol esters, polyether polyols, and castor oil, and (b) at least one polyfunctional isocyanate selected from the group consisting of aromatic diisocyanates, aromatic triisocyanates, and aliphatic diisocyanates; (2) the polyol of the second component is selected from at least one member of the group consisting of polyether polyols, polyol esters, and castor oil; (3) the dialkyltin dicarboxylated catalyst is present in the second component in an amount of from about 0.01 to about 10%, by weight, based on the weight of the second component; and (4) the NCO-terminated prepolymer and the polyol is reacted at a weight ratio of from about 10:90 to about 90:10.

4. The polyurethane forming composition of claim 3 wherein the NCO-terminated prepolymer of the first component is selected from the group consisting of (1) the reaction product of polyoxypropylene glycol, castor oil and diphenylmethane 4,4'-diisocyanate, and (2) the reaction product of castor oil and 3-isocyanate methyl-3,5,5-trimethylcyclohexylisocyanate; wherein the second polyol component is selected from the group consisting of (1) mixtures of ethylene glycol monoricinoleate and polymerized castor oil and (2) polyoxypropylene adducts of trimethylolpropane; and wherein the dialkyltin dicarboxylated catalyst is present in the polyol component in an amount of from about 0.05 to about 5%, by weight, based on the weight of the polyol of the second component.

5. The polyurethane forming composition of claim 4 wherein the dialkyltin dicarboxylated catalyst is selected from the group consisting of dioctyltin diricinoleate, dioctyltin dioleate, didodecyltin diricinoleate and dioctyltin di-6-hydroxy caproate.

6. The polyurethane forming composition of claim 1 wherein the dialkyltin dicarboxylated compound is dioctyltin diricinoleate.

7. A stable polyol/catalyst composition which may be employed in a two component polyurethane forming composition which is non-cytotoxic when cured, when polyol/catalyst composition consists essentially of a mixture of:
(a) at least one polyol;
(b) an effective catalytic amount of a dialkyltin dicarboxylated compound having the formula:

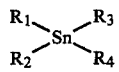

wherein:
R1 and R2 are linear or branched alkyl groups having from about 8 about 18 carbon atoms per molecule; and
R3 and R4 represent carboxylate groups derived from (a) one or more saturated or unsaturated, linear or barnched, aliphatic hydroxy-carboxylic acids having from about 2 to about 18 carbon atoms per molecule; (b) one or more saturated and unsaturated, linear or branched, aliphatic carboxylic acids having from about 14 to about 20 carbon atoms per molecule; and (c) mixtures of (a) and (b).

8. The polyol/catalyst composition of claim 7 wherein $R_1$ and $R_2$ are the same.

9. The polyol/catalyst composition of claim 8 wherein the polyol is selected from at least one member of the group consisting of polyether polyols, polyol esters, and castor oil; and the dialkyltin dicarboxylated catalyst is present in the polyol in an amount of from about 0.01 to about 10%, by weight, based on the weight of the second component.

10. The polyol/catalyst composition of claim 9 wherein the polyol is selected from the group consisting of (1) mixtures of ethylene glycol monoricinoleate and polymerized caster oil and (2) polyoxypropylene adducts of trimethylolpropane and wherein the dialkyltin dicarboxylated catalyst is present in the polyol component in an amount of from about 0.05 to about 5%, by weight, based on the weight of the polyol of the second component.

11. The polyol/catalyst composition of claim 10 wherein the dialkyltin dicarboxylated catalyst is selected from the group consisting of dioctyltin diricinoleate, dioctyltin dioleate, didodecyltin diricinoleate and dioctyltin di-6-hydroxy caproate.

12. The polyol/catalyst composition of claim 7 wherein the dialkyltin dicarboxylated compound is dioctyltin diricinoleate.

13. A cured non-cytotoxic polyurethane composition consisting essentially of the reaction product of:
(a) as a first component at least one NCO-terminated prepolymer;
(b) as a second component comprises at least one polyol; and
(c) an effective catalytic amount of a dialkyltin dicarboxylated compound having the formula:

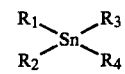

wherein:
$R_1$ and $R_2$ represent linear or branched alkyl groups having less than about 18 carbon atoms per molecule; and
$R_3$ and $R_4$ represent carboxylate groups derived from (a) one or more saturated or unsaturated, linear or branched, aliphatic hydroxy-carboxylic acids having from about 2 to about 18 carbon atoms per molecule; (b) one or more saturated or unsaturated, linear or branched, aliphatic carboxylic acids having from about 14 to about 20 carbon atoms per molecule; and (c) mixtures of (a) and (b);
and wherein said dialkyltin dicarboxylated compound is incorporated into said second component prior to curing and is stable therein.

14. In a process for preparing a separatory device wherein a portion of at least one separatory membrane is secured in a housing using a non-cytotoxic cured polyurethane composition provided by reacting a first component comprising at least one NCO-terminated prepolymer with a second component comprising at least one polyol, wherein the improvement comprises reacting said NCO-terminated prepolymer of the first component with said polyol of the second component in the presence of an effective catalytic amount of a catalyst consisting essentially of a dialkyltin dicarboxylated compound having the formula:

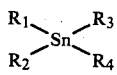

wherein:
R₁ and R₂ represent linear or branched alkyl groups having less than about 18 carbon atoms per molecule; and
R₃ and R₄ represent carboxylate groups derived from (a) one or more saturated or unsaturated, linear or branched, aliphatic hydroxy-carboxylic acids having from about 2 to about 18 carbon atoms per molecule; (b) one or more saturated or unsaturated, linear or branched, aliphatic carboxylic acids having from about 14 to about 20 carbon atoms per molecule; and (c) mixtures of (a) and (b);
and wherein said dialkyltin dicarboxylated compound is incorporated in said second component prior to curing and is stable therein.

15. In a separatory device wherein at least one separatory membrane is secured in a housing in a manner sufficient to perform the selected separatory function using a non-cytotoxic cured polyurethane composition provided by reacting a first component comprising an NCO-terminated prepolymer with a second component comprising at least one polyol, wherein the improvement comprises using as the non-cytotoxic polyurethane composition at least one of said NCO-terminated prepolymers of the first component reacted with at least one of said polyols of the second component in the presence of an effective catalytic amount of a catalyst consisting essentially of a dialkyltin dicarboxylated compound having the formula:

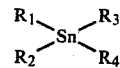

wherein:
R₁ and R₂ represent linear or branched alkyl groups having less than about 18 carbon atoms per molecule; and
R₃ and R₄ represent carboxylate groups derived from (a) one or more saturated or unsaturated, linear or branched, aliphatic hydroxy-carboxylic acids having from about 2 to about 18 carbon atoms per molecule; (b) one or more saturated or unsaturated, linear or branched, aliphatic carboxylic acids having from about 14 to about 20 carbon atoms per molecule; and (c) mixtures of (a) and (b);
and wherein said dialkyltin dicarboxylated compound is incorporated into said second component prior to curing and is stable therein.

* * * * *

UNITED STATES PATENT AND TRADEMARK OFFICE
CERTIFICATE OF CORRECTION

PATENT NO. : 4,332,927                                           Page 1 of 2
DATED      : June 1, 1982
INVENTOR(S) : Dominic Simone It is certified that error appears in the above—identified patent and that said Letters Patent is hereby corrected as shown below:

Column 3, line 68, "polyol-catalysts" should read -- polyol-catalyst --.

Column 4, line 36, "the selection" should read -- the selected --.

Column 9, line 4, "precure" should read -- pre-cure --.

Column 10, line 33, "3,288,879" should read -- 3,228,877 --.

Column 10, line 57, "precure" should read -- pre-cure --.

Column 11, line 22, "intergrity" should read -- integrity --.

Column 11, line 23, "discosure" should read -- disclosure --.

Column 12, line 22, "Means are all provided..." should read -- Means are also provided --.

UNITED STATES PATENT AND TRADEMARK OFFICE
CERTIFICATE OF CORRECTION

PATENT NO. : 4,332,927
DATED : June 1, 1982
INVENTOR(S) : Dominic Simone

It is certified that error appears in the above—identified patent and that said Letters Patent is hereby corrected as shown below:

Column 13, line 9, "70° - 80°C" should read -- 70-80° --.

Column 14, line 65, "Mouse Fiberblast" should read -- Mouse Fibroblast --.

Column 21, line 6, "dioctylthin-diricinoleate" should read -- dioctyltin-diricinoleate --.

Signed and Sealed this

Sixteenth Day of November 1982

[SEAL]

Attest:

GERALD J. MOSSINGHOFF

Attesting Officer   Commissioner of Patents and Trademarks